May 26, 1931.  C. F. CAPELL  1,806,670
SIGNALING APPARATUS FOR MOTOR VEHICLES
Filed March 21, 1929  6 Sheets-Sheet 1

INVENTOR.
Carl F. Capell,
BY
Geo. P. Kimmel.
ATTORNEY.

May 26, 1931.  C. F. CAPELL  1,806,670
SIGNALING APPARATUS FOR MOTOR VEHICLES
Filed March 21, 1929  6 Sheets-Sheet 2
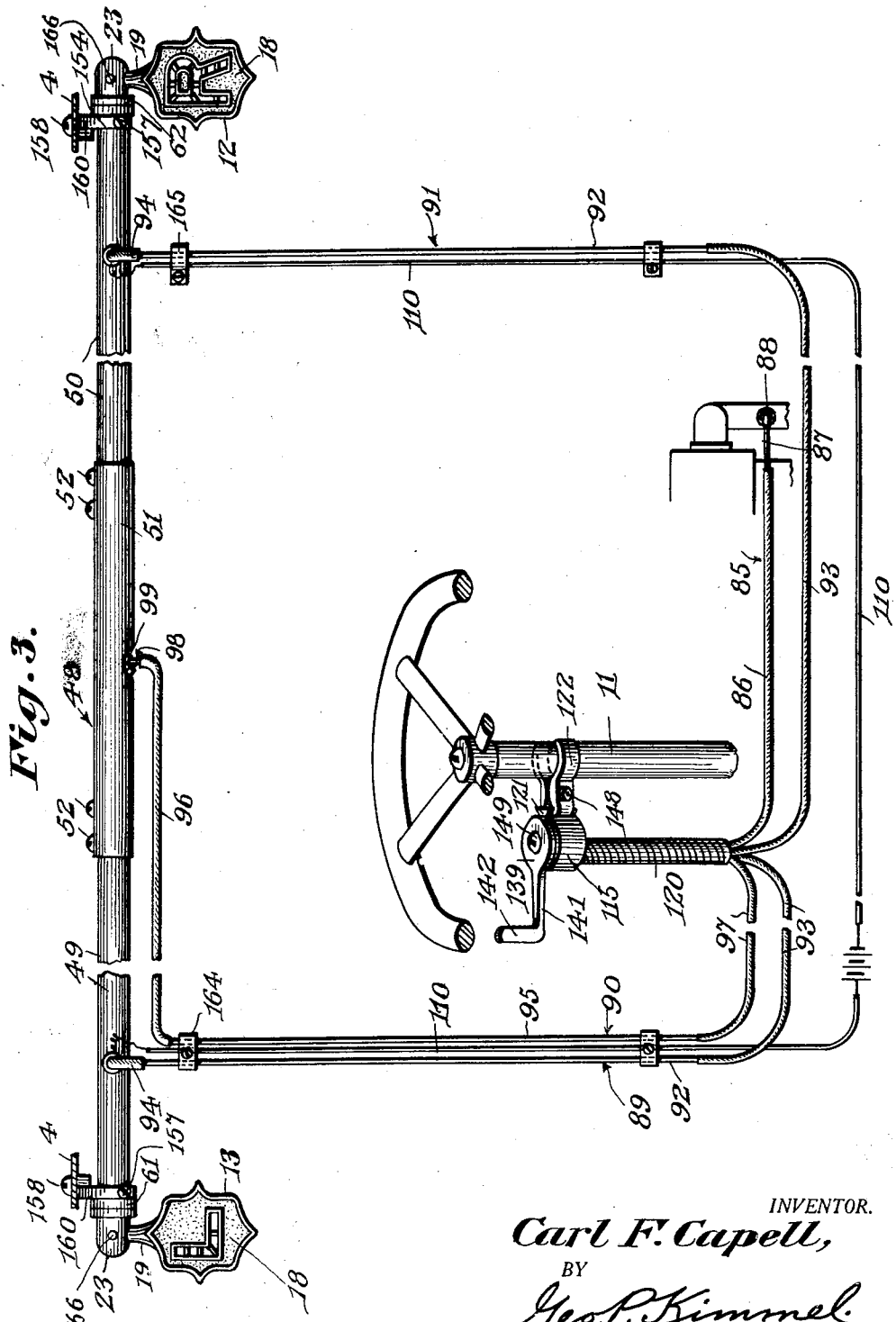
INVENTOR.
Carl F. Capell,
BY
Geo. P. Kimmel.
ATTORNEY May 26, 1931. C. F. CAPELL 1,806,670
SIGNALING APPARATUS FOR MOTOR VEHICLES
Filed March 21, 1929 6 Sheets-Sheet 3
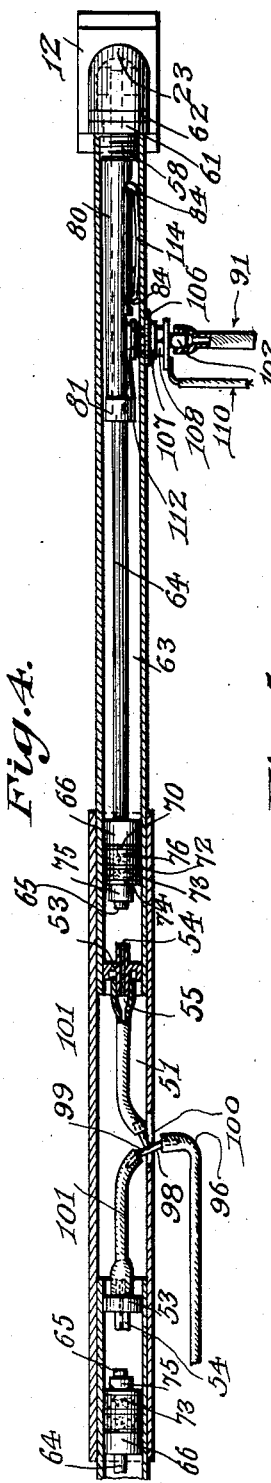
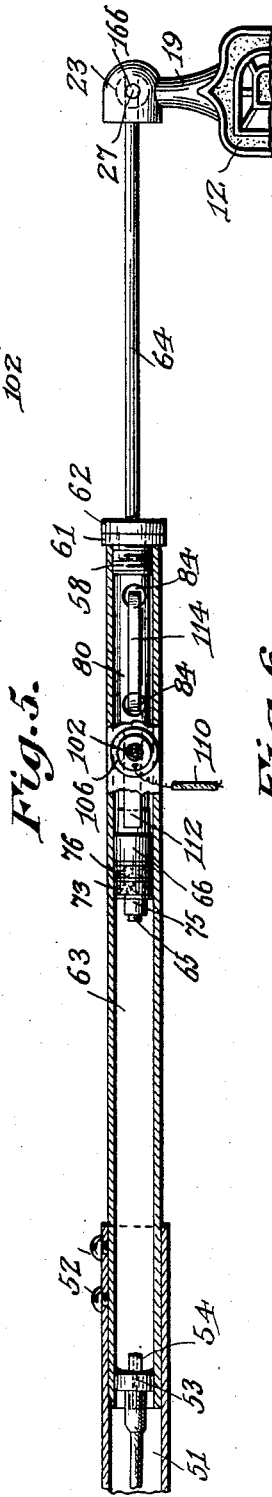
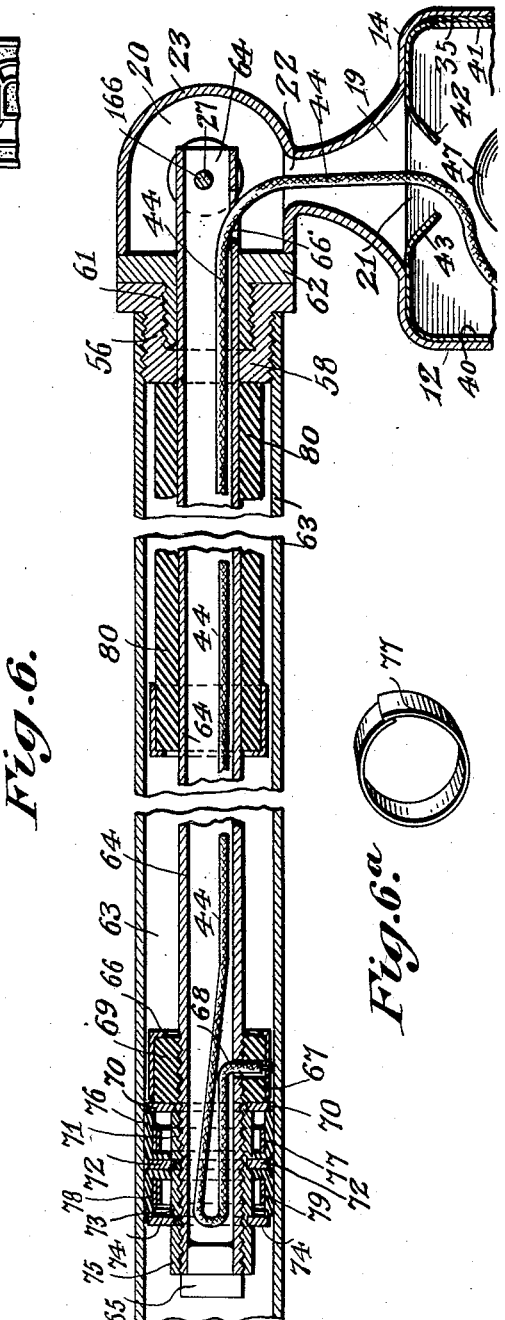
INVENTOR.
Carl F. Capell,
BY
Geo. P. Kimmel.
ATTORNEY.

May 26, 1931. C. F. CAPELL 1,806,670
SIGNALING APPARATUS FOR MOTOR VEHICLES
Filed March 21, 1929 6 Sheets-Sheet 4
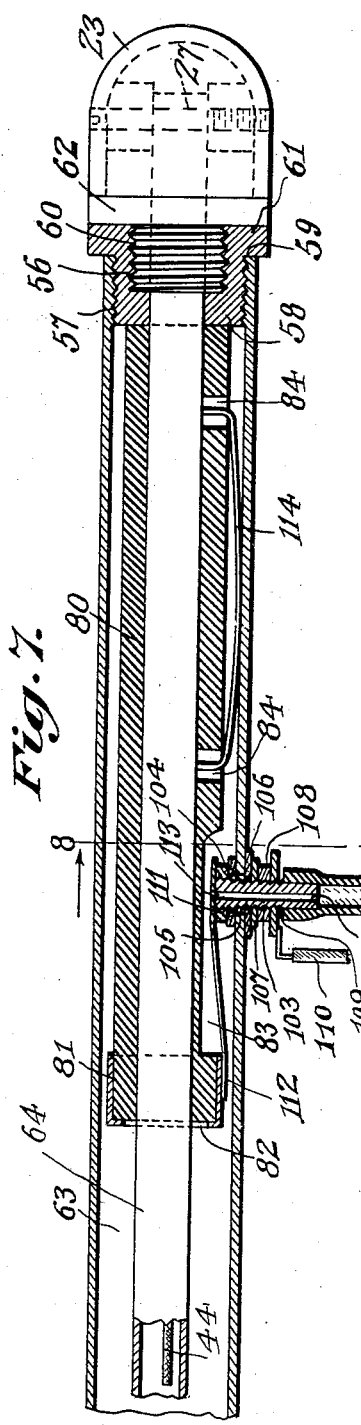
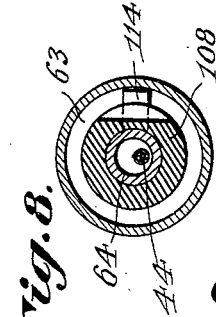
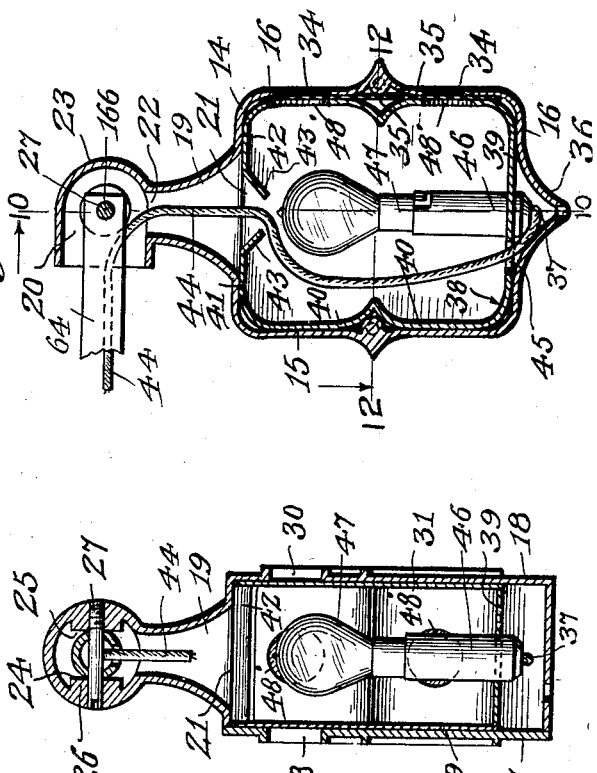
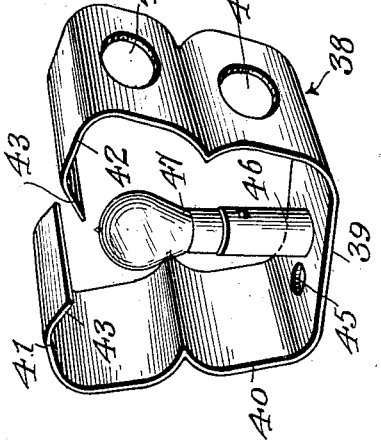
INVENTOR.
Carl F. Capell,
BY
Geo. P. Kimmel.
ATTORNEY.

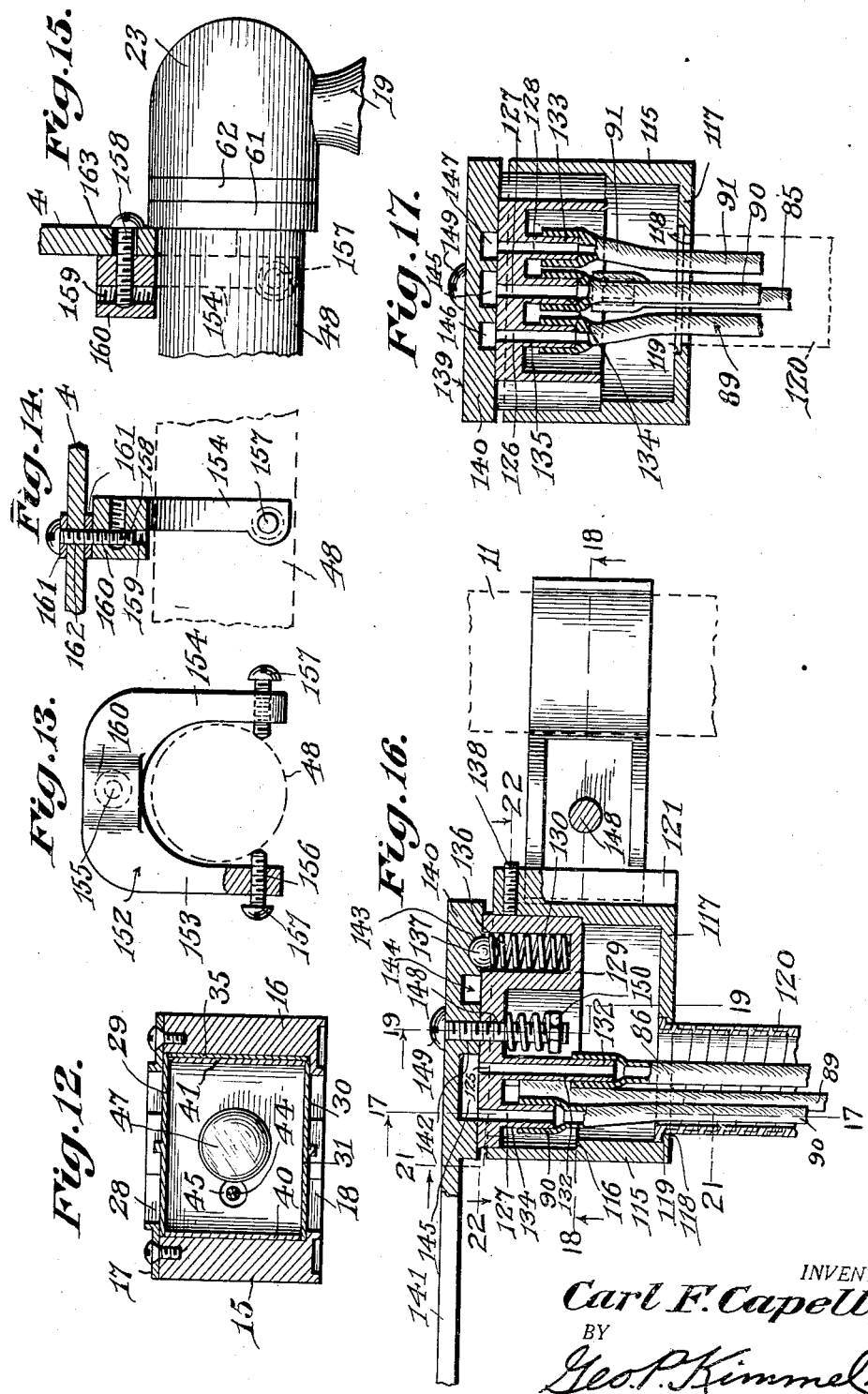

May 26, 1931. C. F. CAPELL 1,806,670
SIGNALING APPARATUS FOR MOTOR VEHICLES
Filed March 21, 1929 6 Sheets-Sheet 6
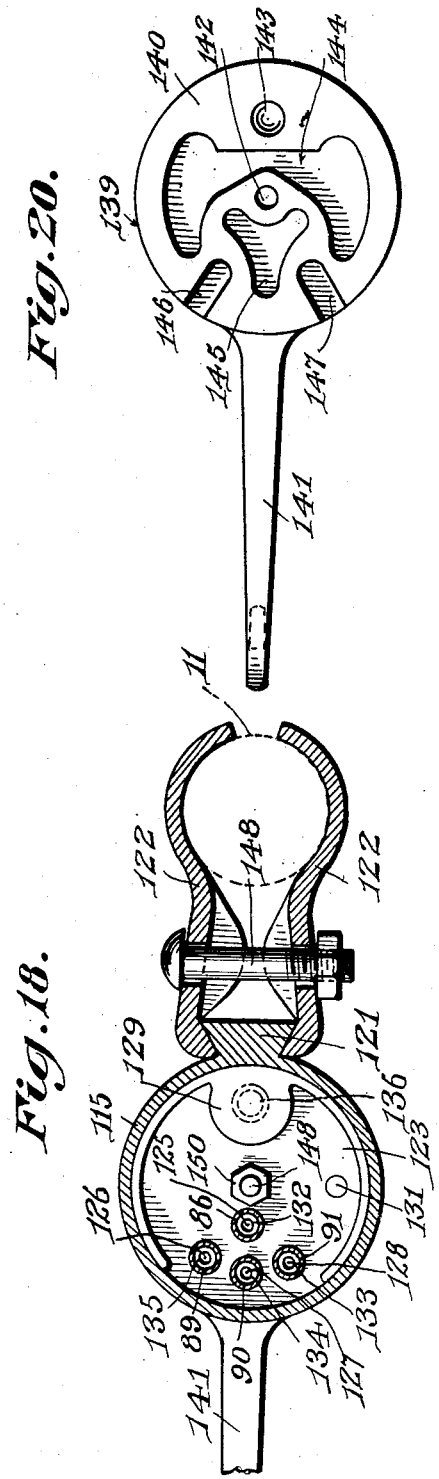
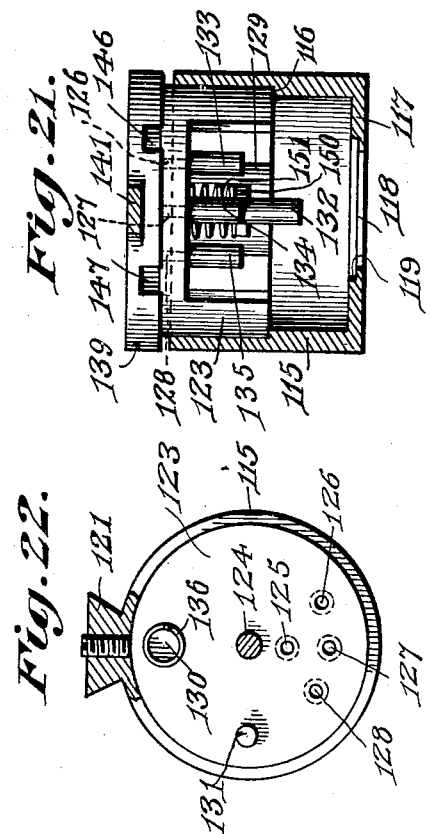
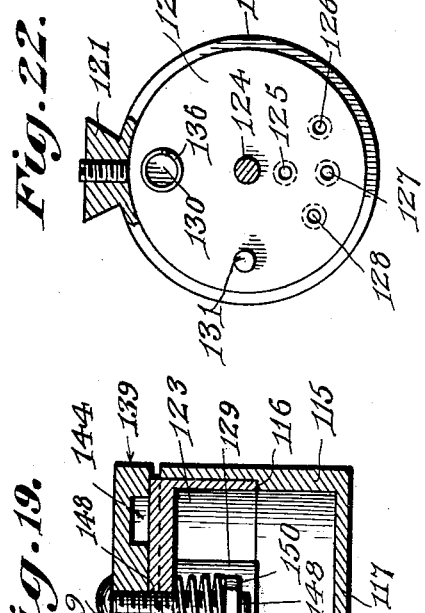
INVENTOR.
Carl F. Capell,
BY
Geo. P. Kimmel
ATTORNEY.

Patented May 26, 1931

1,806,670

UNITED STATES PATENT OFFICE

CARL F. CAPELL, OF SANTA MONICA, CALIFORNIA, ASSIGNOR OF ONE-FOURTH TO HERBERT CUTLER BROWN, OF LOS ANGELES, CALIFORNIA

SIGNALING APPARATUS FOR MOTOR VEHICLES

Application filed March 21, 1929. Serial No. 348,852.

This invention relates to a signaling apparatus for use in connection with motor vehicles, but it is to be understood that an apparatus, in accordance with this invention may be employed in any connection for which it is found applicable, and the invention has for its object to provide, in a manner as hereinafter set forth, a suction operated signaling apparatus for projecting and retracting signaling elements with respect to the sides of the vehicle body to conspicuously indicate, during the day or night when occasion requires to the drivers of vehicles approaching from the front and rear the direction of turn, thereby reducing the possibility of accidents or collisions to a minimum, and with the apparatus capable of being expeditiously and conveniently controlled from the interior of the vehicle by the driver thereof.

A further object of the invention is to provide, in a manner as hereinafter set forth, a signaling apparatus for the purpose referred to capable of being operated to direction of travel indicating position when the vehicle is closed, whereby the driver or other occupants of the vehicle are protected against inclement weather, and overcoming the inconvenience of the driver manually signaling through the open side windows of the vehicle as is the case at present.

A further object of the invention is to provide, in a manner as hereinafter set forth, an apparatus for the purpose referred to including normally stationary, retracted signaling elements selectively projectable laterally with respect to the sides of the vehicle for indicating direction of turn or travel and when projected oscillated from the motion of the vehicle whereby the projected signaling element will be conspicuously displayed and attention directed thereto.

A further object of the invention is to provide, in a manner as hereinafter set forth, a signaling apparatus for the purpose referred to including a suction operated, reciprocatory projecting and retracting mechanism for selective signaling elements, and with such mechanism including means to automatically act to provide an air tight seal therefor during the operation thereof at all times, whereby thoroughly efficient operation is provided when projecting and retracting a signaling element, or in other words such means acts to prevent any possibility of the retardation of a signaling element when moved to or returned from projected position.

A further object of the invention is to provide, in a manner as hereinafter set forth, a signaling apparatus for motor vehicles including a primary suction line and a series of secondary suction lines, the primary line leading from the intake manifold of the engine of the vehicle and the secondary suction lines leading to a suction operated reciprocatory mechanism for laterally projecting and retracting direction signaling elements with respect to the vehicle, and further with the apparatus including new and novel means for selectively establishing communication between a secondary line and the primary line and further establishing communication between the other secondary lines and the atmosphere and by such arrangement the aforesaid mechanism is operated in the desired manner to provide for the signaling elements to be in a projected or retracted position as occasion requires.

Further objects of the invention are to provide, in a manner as hereinafter set forth, a signaling apparatus for the purpose referred to which is simple in its construction and arrangement, strong, durable, readily installed with respect to a motor vehicle, thoroughly efficient in its use, displaying the signaling elements in an unusually distinctive and attention directed manner, conveniently operated by the driver of the vehicle, and comparatively inexpensive to manufacture.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

Figure 3 is a diagrammatic illustration of the signaling apparatus assembled.

Figure 4 is a detail in horizontal section of a suction operated mechanism with a signaling element in retracted position.

Figure 5 is a detail in horizontal section of the suction operated mechanism with a signaling element in projected position.

Figure 6 is a fragmentary view in longitudinal section, upon an enlarged scale of a suction operated mechanism.

Figure 6A is a perspective view of the expander ring employed in connection with a non-metallic sealing element.

Figure 7 is a fragmentary detail in horizontal section upon an enlarged scale of the suction operated mechanism.

Figure 8 is a section on line 8—8 Figure 7.

Figure 9 is a vertical sectional view of a signaling element.

Figure 10 is a section on line 10—10 Figure 9.

Figure 11 is a perspective view of the lamp holder forming part of the signaling element.

Figure 12 is a section on line 12—12 Figure 9.

Figure 13 is a side elevation of clamping bracket.

Figure 14 is a sectional detail showing the clamping bracket attached to the top of the visor of the motor vehicle.

Figure 15 is a sectional detail showing the clamping bracket attached to the end of the visor of the vehicle.

Figure 16 is a vertical sectional view of the controlling mechanism attached to the steering post of the vehicle.

Figure 17 is a section on line 17—17 Figure 16.

Figure 18 is a section on line 18—18 Figure 16.

Figure 19 is a section on line 19—19 Figure 16.

Figure 20 is an inverted plan of the control lever of the controlling mechanism.

Figure 21 is a section on line 21—21 Figure 16.

Figure 22 is a section on line 22—22 Figure 16.

A signaling apparatus in accordance with this invention includes a pair of normally stationary signaling elements selectively projectable to direction indicating position and automatically oscillating when in such position, a suction operated reciprocatory mechanism for selectively projecting the signaling elements to direction indicating position, lighting circuits, a primary suction line permanently in communication with the intake manifold of the engine of the vehicle in which the apparatus is installed, a series of secondary suction lines for selective communication with the primary line and with the secondary suction lines leading to and opening into the suction operated reciprocatory mechanism, and a controlling mechanism for said secondary suction lines for selectively establishing communication therebetween and such reciprocatory mechanisms, and with the apparatus further including other elements of structure to be hereinafter more specifically referred to.

The signaling elements of the apparatus are to be suspendingly supported, preferably at the forward end of the opposite sides of the body of the vehicle in close proximity to the top of the latter, and when one is selected to indicate direction of travel or turn it is shifted laterally from and held for the desired period a substantial distance from one side of the vehicle body. The active signaling element, when in projected position is readily visible, either day or night, by the drivers of motor vehicles approaching from the front and rear, thus reducing accidents to a minimum. The signaling element when in active position is suspended in a manner to provide for the automatic oscillation thereof from the movement of the vehicle and which action will tend to direct attention to the signal by drivers of other vehicles.

When the desired period for signaling indication has expired, the active signaling element is retracted to its inactive position which is in close proximity to the body of the vehicle and when in inactive position it is locked from oscillation.

The suction operated reciprocatory mechanism is common to both signaling elements, and is secured to and transversely of the body of the vehicle in proximity to the top of the front of the latter, whereby such mechanism will be substantially concealed by the visor, under such conditions not marring the appearance of the car. It is to be understood, however, that such mechanism as well as certain of the other elements of the apparatus can be built in the vehicle body as a part of the equipment of the automobile.

The secondary suction lines have portions of the lengths thereof secured against the sides of the inner face of the front of the vehicle body, but if the apparatus is a part of the equipment of the automobile, then such portions of the secondary suction lines will be built in the body of the vehicle.

Figure 1:
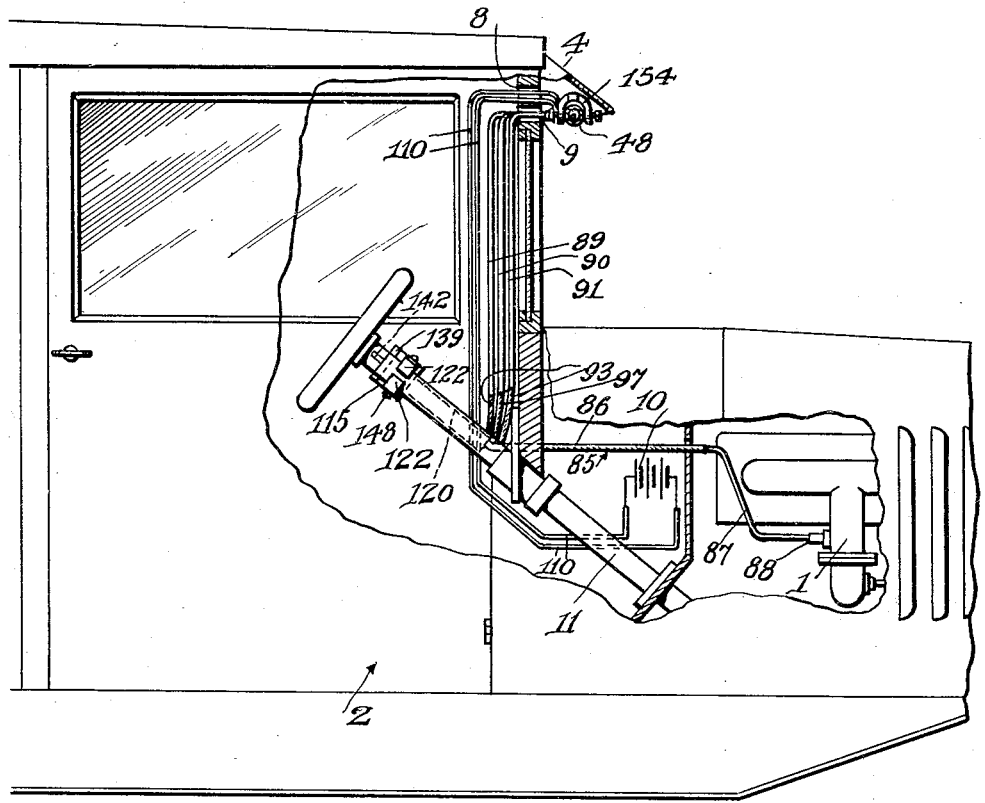
Figure 1 is a side elevation partly in section of a motor vehicle illustrating diagrammatically a signaling apparatus in accordance with this invention installed therewith.

Referring to the drawings 1 indicates the intake manifold of the engine of a motor vehicle, the latter being indicated generally at 2. The top of the body of the vehicle is designated 3, the visor at the front of the vehicle at 4, the sides of the vehicle body at 5, 6 and the front of the vehicle body at 7. A suction operated reciprocatory mechanism is illustrated by way of example, in Figure 1 as being positioned in advance of the upper portion of the front 7 of the vehicle body and concealed by the visor 4, but it is to be understood that such mechanism can be arranged within the interior of the vehicle body at the upper portion thereof or secured at any position desired but with the mechanism being disposed transversely with respect to the automobile.

The top of the front 7 of the vehicle body is formed with upper openings 8 for the passage of the secondary suction lines to the suction operated reciprocatory mechanism and with lower openings 9 for the passage of circuit conductors to such mechanism. The circuit conductors form elements of the lighting systems for illuminating the signaling elements. The circuit conductors to be presently referred to are connected with a source of electrical energy 10 and which would be the battery of the automobile or motor vehicle. The steering column of the vehicle is designated 11.

The signaling elements are two in number and indicated generally at 12, 13, the latter indicating left turn and the former right turn, from the front thereof, as well as from the back thereof. Each signaling element is of like construction, with the exception of the light emitting portion to indicate the direction of travel or turn, therefore but one element will be described as the description of one will apply to the other. With reference to Figures 2, 9, 10, 11 and 12 each signaling element consists of a metallic casing comprising a top wall 14, a pair of side walls 15, 16, the former being the inner side wall and the latter the outer side wall, an apertured bottom 16, a front wall 17 and a rear wall 18. The top wall 14 has formed integral therewith a tubular neck 19 which converges from its lower to its upper end and merges into a hollow head 20 of cylindrical form and which is closed at its outer end and open at its inner end. The top wall 14 is formed with an opening 21, the wall of which forms a continuation of the inner face of the neck 19 and the bottom of the head 20 is provided with an opening 22 the wall of which forms a continuation of the inner face of the neck 19. The outer end of the head 20 is rounded as at 23. The inner face of the neck 19 has formed integral therewith diametrically opposed enlargements 24, 25, which in connection with the body of the head 20 provide supports 26 for a pivot member 27 which is secured in the head 20 and extends diametrically thereof.

The outer ends of the pivot member 27 are flush with the outer periphery of the head 20. The pivot member 27 provides for suspending the signaling elements, from the combined projector and retractor to be presently referred to and the connection is such whereby when the signaling element is projected to direction indicating position it will be caused to automatically oscillate during the travel of the vehicle under such conditions directing attention to such element.

Figure 2:
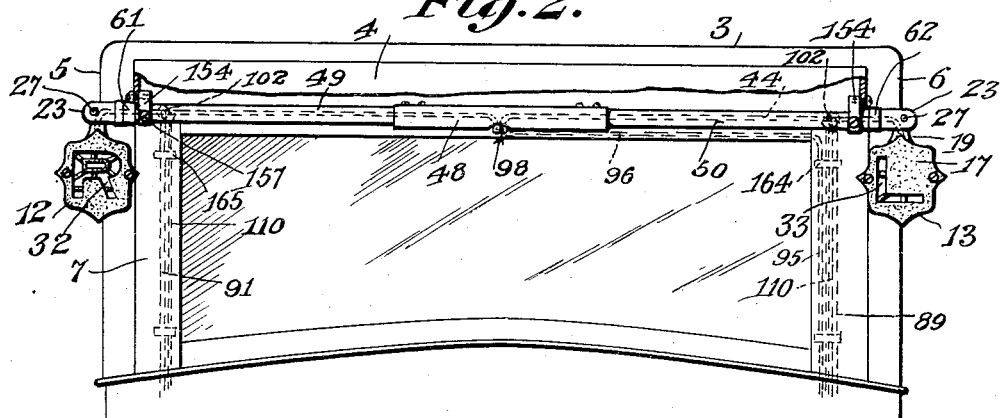
Figure 2 is a front elevation of a motor vehicle, broken away illustrating the adaptation therewith of a signaling apparatus in accordance with this invention.

The front wall 17 is formed with cutout portions 28 which coact with a translucent member 29 to form the signal designation. The wall 18 is formed with cutout portions 30 which coact with a translucent panel or member 31 to provide the signaling designation and which corresponds to that provided by the front wall in connection with the panel or member 29. In Figure 2 the signal element 12 has a signaling indication 32 in the form of the letter R to indicate right turn. In Figure 2 the signaling indication 33 of the element 13 is in the form of the letter L to indicate left turn. The side wall 16 is formed with a pair of openings 34 for the passage of light rays from a side of the signaling element and extending across said openings is a translucent panel 35. The bottom 16 has a centrally depressed part 36 which provides a recess 37.

Arranged within the casing of the signaling element is a lamp holder referred to generally at 38 and which is formed from a strap of resilient material and comprises a flat bottom 39, a pair of resilient sides 40, 41 and a pair of oppositely disposed, inturned flanges 41, 42 which project inwardly from the upper ends of the sides 40, 41. The flanges 41, 42 have their inner portions bent downwardly at an inclination as at 43 and such portions are oppositely disposed and provide a positioning means for the leading in wires 44 of the lighting circuit.

The leading in wires 44 extend through an opening 45 provided in the bottom 39 and extend in the recess 37. The wires 44 are connected to a socket member 46 which is carried by the bottom 39 of the holder 38. The socket 46 depends below the bottom 39 into the recess 37. The lamp of the signaling element is indicated at 47 and which is connected to the socket 46. The leading in wires 44 are positioned between the lamp 47 and the sides 40 of the holder, the side 40 being positioned against the inner face of the wall 15 of the casing. By this arrangement the light rays are not interfered with for passage through the openings 48' formed in the side 41 of the holder and which register with the openings 44 provided in the side wall 16 of the casing of the signaling element. The panel 35 is interposed between the openings 44 and 48'. Preferably the panel 35 will be green. The holder being resilient, acts as a means to reduce the breakage of the lamp to a minimum, as it will retain the same stationary within the casing of the signaling element. In fact the lamp 47 is securely held by the holder within the casing of the signaling element, as the sides of the holder being resilient will constantly tend to bind against the inner faces of the walls 15, 16 of the casing and prevent any shifting of the holder. The head 20 which is integral with the neck 19 projects inwardly from the upper end of the neck and the inner diameter of the head 20 is such with respect to the combined projector and retractor that automatic oscillating movement will be imparted to the signaling element, due to the motion of the vehicle when the signaling element is in its projected or direction indicating position and that the oscillating movement of the element will be limited in either direction, due to the contact of the head 20 with the combined projector and retractor, and in this connection see the arrangement of the head 20 with respect to the projector and retractor as shown in Figure 9.

The suction operated mechanism for selectively projecting and retracting the signaling element, also constitute circuit opening and closing means for the lighting circuits of the apparatus. Preferably such mechanism is set up with a sectional, telescopic tubular housing to enable the adjustability of the length thereof to correspond to different widths of motor vehicle bodies. It is to be understood however, that if the apparatus, is to be apart of the equipment of the automobile, the tubular housing need not be of the adjustable type, as it will be formed of a length corresponding to the width of the vehicle of which it is to form a part of the equipment thereof.

The suction operated mechanism is best shown in Figures 2, 3, 4, 5, 6, 7 and 8, and it includes a pair of like projecting and retracting devices for the signaling elements, a chamber for each device and a guide for each device and with the guide constituting a contact element in a light circuit, therefore the description of but one of said devices and its associated element will be set forth, as such description will apply to the other device and its associated element. A sectional tubular housing hereinbefore referred to is common to said devices and their several associated elements.

The tubular housing is referred to generally at 48 and it comprises a pair of outer sections 49, 50 and an intermediate section 51 which is telescoped by the sections 49, 50 and these latter are adjustably connected to the section 51 by the retaining devices 52. The inner ends of the sections 49, 50 telescope in section 51. Each outer section of the tubular housing 48 carries a projecting and retracting device for a signaling element, provides a chamber for such device and within the chamber is arranged the guide for the device and with the guide providing a contact element for a light circuit. Each projecting and retracting device has associated therewith a light circuit and such lighting circuits will be hereinafter more specifically referred to.

Each outer section of the tubular housing 48 has its inner end closed by a flanged disk 53 and the latter is formed with a central aperture 54 and a nipple 55 which projects from the forward and rear faces of the disk 53 and registers with aperture 54. The function of the nipple 55 and aperture 54 will be presently referred to. The arrangement of the disk 53 with respect to an outer section of the tubular housing 48 is clearly shown in Figures 4 and 5. The outer end of each outer section of the tubular housing 48 has extending therein a peripherally threaded flanged packing gland 56 which engages with the threads 57 formed on the inner face of such outer section at the outer end thereof. The flanges of the gland 56 are indicated at 58, 59 and are oppositely disposed with respect to each other. The flange 59 is arranged at the outer end of the gland and abuts against the edge of the outer section of the housing 48. See Figure 7. The flange 58 extends inwardly. That portion of the inner face of the gland 56 from the flange 58 to the outer end of the gland is interiorly threaded as at 60. Threadably engaging with the threads 60 is a peripherally threaded flanged collar 61 which is of a length to abut against the flange 58 and the inner diameter of the collar 61 corresponds to the inner diameter of the flange 58. The flange of the collar 61 is indicated at 62 and which abuts against the flange 59 of the gland 56. This arrangement provides a leak tight closure for the outer end of the outer section of the tubular housing 48.

The disk 53, in connection with the gland 56 and outer section of the housing 48 provides a chamber 63 for a projecting and retracting device for a signaling element.

The said device is in the form of a piston head and a piston rod and the head is positioned in proximity to the inner end of the rod. The projecting and retracting device is best shown in Figure 6 and it comprises a tubular rod 64 of materially less diameter than the diameter of the chamber 63 but of a diameter to snugly fit the passage provided by the flange 58 of the gland 56 and the collar 61. The rod 64 is closed at its inner end by a plug 65. The rod 64 normally projects outwardly with respect to the collar 61 and has the body thereof in proximity to its outer end formed with an opening 66' for a purpose to be presently referred to. The periphery of the rod 64 at its inner end is threaded and mounted on the forward part of such rear threaded portion, as well as being secured therewith is an interiorly threaded collar 66 of insulation material and of a diameter less than the diameter of the chamber 63. The collar 66 is formed with a diametrically disposed opening 67 which registers with an opening 68 formed in the rod 64. Fixed to the collar 66 as well as lapped against the forward face of the latter is a conducting band 69 formed of metallic material. The purpose of the openings 67, 68 and band 69 will be presently referred to.

Positioned on the rod 64 and arranged against the rear face of the collar 66 is a spacer member 70 of less diameter than chamber 63. Secured to the rear threaded portion of the rod 64 and abutting against the spacer member 70 is an interiorly threaded collar 71 having its outer diameter materially less than the diameter of the spacer member 70. Positioned against the rear of the collar 71 is a spacer member 72 of the same type as the spacer member 70 and abutting against the spacer member 72 is an interiorly threaded collar 73 which is secured to the threaded portion of the rod 64 and abuts against the spacer member 72.

Positioned against the rear of the collar 73 is a spacer member 74 which is secured in abutting relation with respect to collar 73, by an interiorly threaded collar 75 which is secured to the threaded rear portion of the rod 54. Arranged between the spacer members 70 and 72 is a flanged, yieldable sealing element 76 formed of non-metallic material and of L-shape in lengthwise section. The element 76 includes a portion which snugly engages the collar 71 and a portion which snugly engages the wall of the chamber 63. That portion of the element 76 which engages the collar 71 is the body of the element and abuts against the forward face of the spacer member 72. That portion of the element 76 which engages the wall of the chamber 63 is the flange of the element and it projects forwardly from the spacer member 72 and abuts the spacer member 70. That portion of the element 76 which snugly engages the wall of the chamber 63 is maintained in such position by an overlapping, split expander ring 77 which constantly bears against the element 76 for the purpose of maintaining it against the wall of the chamber 63 to provide an air-tight seal.

Arranged between the spacer members 72 and 73 is a sealing element 78 constructed in the same manner as the sealing element 76, but oppositely disposed with respect thereto. The element 78 extends from spacer member 72 to spacer member 74 and performs a like function as element 76. The element 78 is constantly maintained in engagement with the wall of the chamber 73 by an overlapping, split expander ring 79 therefor.

The rod 64 has arranged therein and extending therefrom the circuit connections or leading in wires 44 from the lamp 47. The leading in wires or circuit connections 44 extend through the opening 66' and also extend through the openings 68, 67 and secured in electrical contact with the band 69 the latter providing in a manner as hereinafter set forth, for closing the lighting circuit to the lamp.

Positioned within the outer section of the housing 48, as well as secured therewith in a manner to be presently referred to is the guide element for the bar 64 and such element consists of a sleeve 80 of insulation which abuts against the inner end of the gland 56. See Figure 6. The sleeve 80 also constitutes a stop or abutment for limiting the outward movement of the rod 64. The sleeve 80 has its inner diameter corresponding to the inner diameter of the collar 61. The sleeve 80 is of less diameter than the inner diameter of the outer section of the tubular housing 48, and has its inner end provided with a band 81 of conducting material and with the band crimped, as at 82, against the inner end edge of sleeve 80. The band 81 coacts with the band 69 for the purpose of closing the lighting circuit. The periphery of sleeve 80 is dished out, as at 83, to provide a clearance for a purpose to be presently referred to and the body of the sleeve 80 is formed with a pair of spaced openings 84 the purpose of which will be hereinafter set forth.

The primary suction line is indicated generally at 85 and consists of a section 86 formed of rubber tubing, and a section 87 consisting of a length of a metallic tubing capable of being bent and which is connected at 88 to the intake manifold 1 of the engine of the vehicle. The section 87 telescopes the section 86 and the latter is connected with the controlling mechanism at a point to be presently referred to. The point of connection between the section 86 of the primary suction line and the controlling mechanism is heretofore shown in Figure 16.

Three secondary or auxiliary suction lines are employed in connection with the apparatus and one is generally indicated at 89, another at 90 and the other at 91. See Figure 3. The lines 89 and 91 are constructed alike and each of which includes a section 92 formed of metallic tubing, a section 93 formed of rubber tubing and a section 94 also constructed of rubber tubing. The section 94 is of materially less length than section 93. The section 92 telescopes the sections 93, 94. The suction line 89 is employed in connection with the signaling element 13. The suction line 90 is common to the two signaling elements 12, 13 and the line 91 is employed for the signaling element 12. See Figure 3. The line 90 comprises a section 95 formed from a length of metallic tubing, a section 96 formed from a length of rubber tubing and a section 97 also formed from a length of rubber tubing. The sections 93 of the lines 89, 91 and section 97 of the line 90 are connected to the controlling mechanism and the points of connection are clearly shown in Figures 16 and 17. The line 90 is connected to a tubular T 98, that is to say, the section 96 of line 90 is telescoped by a tubular T-shaped line continuation which is arranged within section 51 of housing 48 and projects through an opening 99 formed in said section 51. The tubular T is constructed of metallic material and the branches thereof are indicated at 99, 100. The said branches telescope a pair of short rubber tubing sections 101, and one of said sections 101 is connected to the nipple 55 at the inner end of one outer section of the housing 48 and the other section 101 is connected to the nipple 55 at the inner end of the other outer section of housing 48. The nipples 55 telescope the tube sections 101. See Figure 4.

Each outer section of the tubular housing 48 has connected therewith a tubular terminal or binding post. The said terminals or binding posts project laterally from such outer sections of the housing and as they are of like construction and arrangement, but one will be described as the description of one will apply to the other. The tubular terminals or binding posts are generally referred to at 102. The tubular terminal which is carried by the section 49 of housing 58 telescopes the section 94 of the auxiliary suction line 89. The tubular terminal carried by the section 50 of the housing 48 telescopes the section 94 of the auxiliary suction line 91. See Figure 3.

Each hollow terminal or binding post, as clearly shown in Figure 7, consists of a short, peripherally threaded metallic tube 103 which at its end engages in a nut 104. The outer section which carries the tube 103 is provided with an opening 105 and seated against the inner and outer faces of such section and registering with the opening 105 is a washer 106 of insulation material. The washer 106 surrounds the tube 103 and the inner washer 106 abuts against the nut 104. This arrangement insulates the tube 103 from the outer housing section. A washer 107 is positioned against the outer washer 106 and threadedly engaging with the tube 103 and abutting against the washer 107 is a securing nut 108 which coacts with the nut 104 for fixedly securing said tube 103 to the outer housing section.

Positioned against the nut 108 and surrounding the tube 103 is a terminal 109 of circuit forming means 110 which is electrically connected to the source of electrical energy or battery 10. Secured to the nut 104 is a resilient conductor 111 which is also secured, as at 112 to the band 81 fixed on the sleeve 80 and such arrangement provides for coupling the sleeve 80 to the outer housing section. The conductor 111 is formed with an opening 113 which registers with the opening provided by tube 103 and provides means for establishing communication between an auxiliary suction line and the chamber 63. The sleeve 80 is maintained in spaced relation with respect to the outer section of the housing by a resilient, yoke-shaped member 114 which extends through the openings 84 and abuts against the bar 64. The member 114 also abuts against the inner face of the outer housing section. The member 114 furthermore provides a ground connection for the lighting circuit, the ground being the tubular housing.

A pair of lighting circuits are employed, one for each signaling element, and each circuit is normally open. The circuit is closed when the band 69 contacts with the band 81 and remains closed as long as the bands are in contact. The circuits being from the battery by circuit forming means 110 to terminal 109, tube 103, conductor 111, band 81, band 69, circuit connections or leading in wires 44 to lamp and then to ground.

The controlling mechanism for the suction operated reciprocatory mechanism for projecting and retracting the signaling elements comprises a circular open top housing 115 formed with an internal, annular shoulder 116. The bottom of the housing is indicated at 117 and is formed with an opening 118 having the wall thereof shouldered as at 119.

Connected with and depending from the bottom 117 of housing 115 is a tubular flexible shaft 120 which encloses the primary suction line 86, as well as the auxiliary suction lines. The housing 115 is formed on its periphery with a vertically disposed dove-tailed tongue 121 engaged by an adjustable clamping device 122 for the purpose of coupling the housing 115 with the steering column 11. Arranged within the housing 115 and seating on the shoulder 116, as well as projecting slightly about said housing 115 is a head element for the several suction lines more clearly shown in Figures 16, 17, 21 and 22. Such head element comprises a disk 123 formed with an axial opening 124 and a series of openings 125, 126, 127 and 128. The lower face of the disk 123 is provided with a depending portion 129 having a socket 130 which opens at the upper face of the disk 123. Projecting from the upper face of the disk 123 is a stop pin 131. Integral with and depending from the lower face of disk 123 are tubular extensions 132, 133, 134 and 135 which register with the openings 125, 126, 127 and 128 respectively. The primary suction line 85 is telescoped by the extension 132. The suction line 89 is telescoped by an extension 135. The suction line 90 is telescoped by the extension 134 and the suction line 91 by the extension 133.

Arranged within the socket 130 is a compression spring 136 which has a bearing ball 137 seated in the upper end thereof. The head element is clamped from movement within the housing 115 by the binding screw 138. See Figure 16. Mounted on the upper end of the head element for the suction line is an oscillatory control lever therefor and said lever is referred to generally at 139 and it consists of a disk 140 of a diameter corresponding to the diameter of the housing 115. Projecting from the disk 140 is a handle member 141 having an upturned outer end 142 to facilitate the shifting thereof by the driver of the vehicle. The disk 140 centrally thereof is provided with an opening 142. See Figure 20. The inner or lower face of disk 140 is also provided with a recess 143 into which extends the bearing ball 137 and further formed with a recess 144 having a narrow, intermediate portion and end portions disposed at an angle with respect to the intermediate portion. Operating within the recess 144 is the stop pin 131. The inner face of the disk 140 is also provided with a substantially triangular shaped pocket 145 having the walls thereof curved. The intermediate portion of the recess 144 is arranged between the openings 142 and the cavity or recess 143. The pocket 145 is arranged between the end portions of the recess 144 and on the opposite side of the opening 142. The inner face of disk 144 is furthermore provided with a pair of oppositely disposed, inclined grooves 146, 147 for communication with the atmosphere.

The control lever 139 is mounted on a vertically disposed pivot 148, having a head 149 at its upper end which overlaps the outer face of the disk 140. The pivot 148 extends down through the openings 142 and 144 and is formed with peripheral threads. Secured to the pivot 148 is an adjusting nut 150 and interposed between the nut 150 and the disk 123, as well as surrounding the pivot 148 is a take-up spring 151 which constantly maintains the disk 140 in snug engagement with the upper face of the disk 123. The action of the spring 150 will provide a substantially airtight seal between the disks 123 and 140.

The opening 126 in disk 123 normally communicates with the groove 147 and the opening 128 in the disk 123 normally communicates with the groove 146. The opening 125 in disk 123 permanently communicate with pocket 145, the latter being what may be termed a by-pass. The opening 127 normally communicates with the pocket 145 and is also adapted to communicate with either groove 146 or 147 when the control lever 139 is shifted from normal. The movement in either direction of the control lever is arrested by the stop pin 131 coacting with the walls of the recess 144. The spring 151 also constitutes a take-up device to compensate for wear between the opposed faces of the disks 123 and 140.

With reference to Figures 13, 14 and 15 a clamping bracket is illustrated and which is employed for securing the housing 48 to the top or to the ends of the visor 4. The bracket is generally indicated at 152 and the arms thereof at 153, 154. The bracket 152 has its top formed with an opening 155 and each of its arms with an opening 156. The walls of each of said openings are threaded. Retaining screws for the housing 48 extend through the openings 156 and are indicated at 157. In Figure 14 the housing 48 is suspended from the top of the visor and a suspension or coupling screw 158 is provided for such purpose and which threadedly engages with the wall of an opening 159, formed in the top of the bracket and disposed at right angles to the opening 155. In Figure 15 the bracket 152 is employed for suspending the housing 48 from an end of the visor and in this connection the suspension screw 158 threadedly engages with the wall of the opening 155. The top of the bracket 152 is enlarged as at 160 and the openings 155 and 159 are formed in said enlargement. The opening 155 intersects the opening 159. When the housing 48 is suspended from the top of the visor washers 161 are employed.

The top of the visor 14 is provided with an opening 162 for the passage of the screw 158 and the end of the visor is also formed with an opening 163 for the passage of screw 158. The bracket 152 is of a size to snugly envelop the housing 48 and has screws 157 abut against the housing 48 below the transverse median thereof.

The metallic sections 92 and 95 of the auxiliary suction lines are positioned vertically. When the apparatus is set up the section 92 of line 89 and section 95 of line 90 are arranged in parallelism and one of the circuit conductors or circuit forming means or wires 110 is arranged between such sections and the said sections and conductor are connected together by a clamping means 164. See Figure 3. The section 92 of the line 91 and a conductor 110 are disposed vertically and connected together by a clamp 165. See Figure 4.

The suction line 90 is provided for maintaining the signaling elements in a retracted position. The suction line 89 is employed for projecting the signal 13 and the suction line 91 is employed for projecting the signaling element 12. The signaling elements are selectively projected and the control thereof is provided by the control lever 139. This arrangement is made possible when suction line 89 is brought into communication with the by-pass or pocket 145 and when the suction line 91 is brought into communication with the by-pass or pocket 145. Normally the suction line 89 communicates with the atmosphere through groove or channel 146 and suction line 91 normally communicates with the atmosphere through groove or channel 147.

Suction line 90 normally tends to maintain the signals in a retracted position, but when suction line 89 is thrown into position to project signal 13, then suction line 90 communicates with the atmosphere to take off the suction acting against the inner side of the head of the projecting and retracting device for a signaling element and this statement will also apply to suction line 91 when it is thrown into communication with the intake manifold for the purpose of projecting signaling element 12.

When the signaling elements are in a retracted position, the heads 20 thereof abut against the flanged collar 61 and the signal elements are locked from oscillation. When the signaling elements are projected to direction indicating position, they will have an oscillatory movement imparted thereto automatically on the motion of the vehicle, and this is obtained in view of the fact that the pivots 27 are loosely mounted in the outer ends of the bars 64. The bars 64 are provided with openings 166 for the passage of the pivots 27. The pivots 27 are fixed to the heads of the signaling elements.

The sealing elements 76 and 78 act at all times to maintain an air-tight joint during the reciprocation of the projecting and retracting devices and also when said devices are stationary. Such sealing elements are constructed of non-metallic material and in case of wear the expanders therefor act thereon to maintain such elements in snug sliding fit with the walls of the casing 63.

When the signaling elements are projected to direction indicating position they will be retained in such position as long as suction continues through suction lines 89, 91, and immediately when the suction is cut out in such lines, the suction line 90 will provide for the suction acting in a manner to quickly retract the elements and fixedly maintain such elements in retracted position until the lines 89 and 91 are again opened.

The elements secured in the inner end of each rod 64 constitutes a piston head and the rod 64 constitutes a piston rod. The head and rod operate in a body of oil, not shown, within the chamber 63. The gland 56 and collar 61 prevent leakage at the outer end and the disk 53 prevents leakage at the inner end of the chamber 63.

It is thought the many advantages of a signaling apparatus, in accordance with this invention and for the purpose set forth can be readily understood, particularly as it does not require the driver of the vehicle to project his arms through the sides of the vehicle to indicate direction of travel, and further because the elements act positively when swung to active position and further when swung to active position automatically oscillate to attract attention thereto, and although the preferred embodiment of the invention is as illustrated and described, yet it is to be understood that changes in details of construction can be had which fall within the scope of the invention as claimed.

What I claim is:

1. A signaling apparatus comprising a housing forming a suction chamber, an illuminable signaling element arranged exteriorly of one end of said chamber, a suction operated, reciprocatory rod for projecting and retracting said element with respect to said end of said chamber, a stationary abutment within the chamber and extending inwardly from said end of the latter and providing for arresting the outward movement of said rod, said rod extending through said abutment, a suction line leading to the other end of said chamber, a normally open circuit forming means for said element including circuit connections and a contact bodily carried with said rod, a contact carried by the inner end of the abutment to be engaged by said other contact to close said circuit, a ported member carried by and insulated from the housing, opening into said chamber, electrically connected to the contact on the abutment and in circuit with an electrical source, and a suction line opening into said ported member.

2. A signaling apparatus comprising a housing providing a suction chamber having a suction port at one end, an illuminable signal exteriorly of the housing, a suction operated reciprocatory contact operating in said chamber and electrically connected with said signal, a stationary circuit closing means positioned within said chamber and arranged in the path of and coacting with said contact for closing the circuit of said signal, a tubular member of conducting material carried by and insulated from the housing in proximity to the other end of said chamber and providing a suction port opening into the latter, means for connecting said member to an electrical source and to a suction source, and a conductor within said chamber for electrically connecting said member to said circuit closing means, said conductor having an opening registering within the inner end of the port provided by said member.

In testimony whereof, I affix my signature hereto.

CARL F. CAPELL.